United States Patent
Dubois et al.

(10) Patent No.: US 10,338,826 B2
(45) Date of Patent: Jul. 2, 2019

(54) MANAGED-NAND WITH EMBEDDED RANDOM-ACCESS NON-VOLATILE MEMORY

(71) Applicant: Cypress Semiconductor Corporation, San Jose, CA (US)

(72) Inventors: Sylvain Dubois, Tourrettes-sur-Loup (FR); Stephan Rosner, Campbell, CA (US); Clifford A. Zitlaw, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 217 days.

(21) Appl. No.: 14/054,312

(22) Filed: Oct. 15, 2013

(65) Prior Publication Data

US 2015/0106548 A1 Apr. 16, 2015

(51) Int. Cl.
G06F 3/06 (2006.01)
G06F 9/4401 (2018.01)
G06F 12/02 (2006.01)

(52) U.S. Cl.
CPC .......... *G06F 3/0619* (2013.01); *G06F 3/0659* (2013.01); *G06F 3/0688* (2013.01); *G06F 9/4401* (2013.01); *G06F 12/02* (2013.01); *G06F 12/0284* (2013.01); *G06F 2212/1004* (2013.01)

(58) Field of Classification Search
None
See application file for complete search history.

(56) References Cited

U.S. PATENT DOCUMENTS

| | | | |
|---|---|---|---|
| 8,171,277 B2 * | 5/2012 | Smith et al. | 713/2 |
| 2005/0251617 A1 * | 11/2005 | Sinclair | G06F 3/061 711/103 |
| 2007/0186061 A1 * | 8/2007 | Oh | G06F 13/1694 711/154 |
| 2008/0209510 A1 * | 8/2008 | Ito | 726/2 |
| 2011/0219168 A1 * | 9/2011 | Stephens | 711/103 |
| 2012/0192035 A1 * | 7/2012 | Nakanishi | 714/766 |

OTHER PUBLICATIONS

Quicklogic Corporation, "Secure Digital Input/Output (SDIO) Host Controller Data Sheet", 2010 Site:http://www.quicklogic.com/assets/pdf/data-sheets/QL-SDIO-Host-Controller-PSB-Data-Sheet.pdf.*
United States Copyright Office, "Copyright Notice", 2013, http://www.copyright.gov/circs/circ03.pdf.*
Judd Heap, "Increase your boot options with Managed NAND", 2007, http://www.embedded.com/print/4007124.*

* cited by examiner

*Primary Examiner* — Reginald G Bragdon
*Assistant Examiner* — Edward Wang

(57) ABSTRACT

Systems and methods embed a random-access non-volatile memory array in a managed-NAND system to execute the boot code or other time-sensitive applications. By embedding this random-access non-volatile memory in the managed-NAND system, either on the memory controller chip or as a separate chip within the managed-NAND system package, an application may be read with fast initial access time, alleviating the slow access time limitations of NAND Flash technology. Depending on the size of the application, the system may be configured to read the whole application content or only a time-critical portion from this embedded random-access non-volatile memory array.

3 Claims, 9 Drawing Sheets

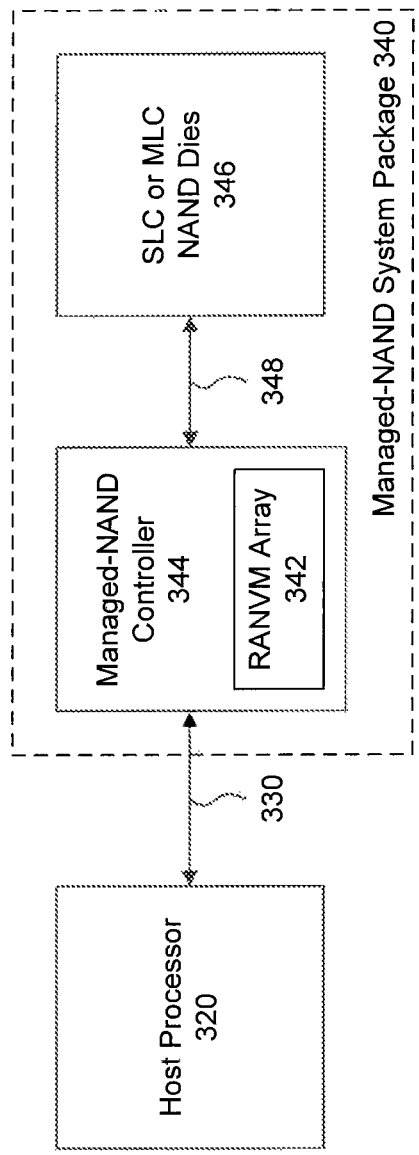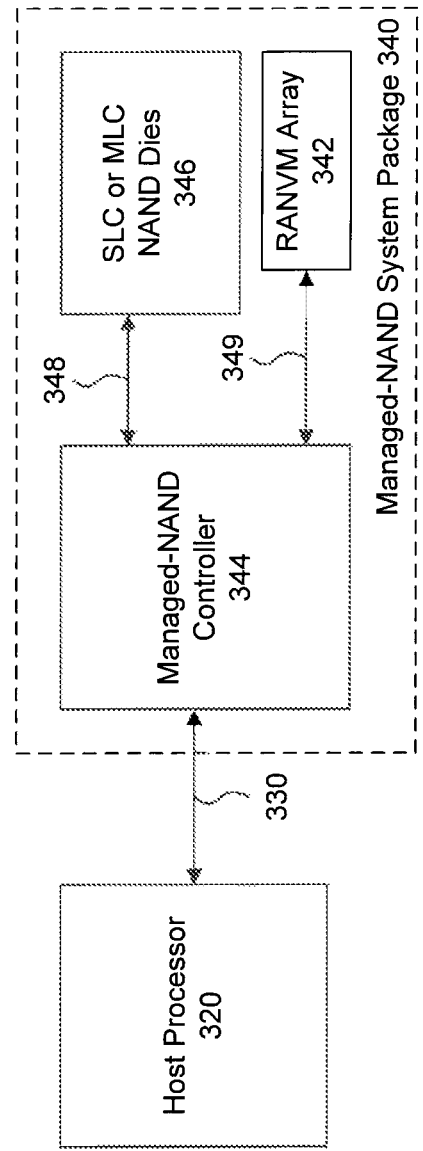

MANAGED-NAND WITH EMBEDDED RANDOM-ACCESS NON-VOLATILE MEMORY

FIELD OF THE INVENTION

This invention relates to memory controllers, particularly managed-NAND memory controllers having an embedded random-access non-volatile memory array, where this embedded memory array is used to execute the boot code and other time-critical applications.

BACKGROUND

Modern electronic devices rely on volatile or non-volatile memory to store code or application data processed by application software. Among the different types of non-volatile memory, Flash memory technology has attracted significant attention due to its ability to read and write data in small blocks. There are two architectures commonly used in Flash memory technology, referred to as NOR and NAND architectures, respectively. The NOR architecture, much like a memristor or a phase-change memory, permits fast read random-access that is ideal for code execution and storage. The NAND architecture optimizes the memory cell size and it is suitable for high-density data storage.

The behavior of NAND technology memory bits cannot be fully guaranteed over the lifetime of the memory products. The reliability of each block may vary across the temperature range, the usage conditions, and the lifetime of the products. Due to yield considerations, memories based on the NAND flash architecture are shipped with identified bad blocks. The memory controller is then responsible for the management of these bad blocks over the lifetime of the product. Bad block management, as well as other logic actions such as error code detection and correction, garbage collection, and wear leveling, are the key components of managed-NAND memory controllers. These controllers are systems that include a controller and NAND Flash arrays in the same package and mitigate the NAND reliability issues.

When NAND technology is used to store the boot code, the memory manufacturer guarantees the reliability of the first memory blocks at production time. Typical boot sequences require large memory size which is spread across several memory blocks. System designers usually map the boot sequence at several memory locations to address the lack of reliability of the entire memory array over the lifetime of the electronic device. They rely on error code correction, bad block management, and wear leveling techniques to alleviate the shortcomings of NAND technology. These logic blocks however add extra latency to the inherent NAND architecture latency, which can be up to 75 μs for MLC Flash memory. Other reliable system designs use a small external boot memory based on NOR technology to execute the boot code and other sensitive applications. This approach requires an additional chip and interconnections on the device board, which deprives designers from valuable space that could be used for other applications.

SUMMARY

Provided herein are system, apparatus, method and combinations and sub combinations thereof, which illustrate embodiments for implementing a managed-NAND memory system. In one example, a system comprises an embedded random-access non-volatile memory array in the package of a managed-NAND system. This embedded random-access non-volatile memory can be as memristor, a phase-Change memory array, or a Flash memory array based on NOR architecture. Embedding this memory into the managed-NAND system package permits fast and reliable read random-access when used to store the boot code or other time-sensitive applications.

An embodiment of the present disclosure comprises a host processor connected to a managed-NAND system package where the embedded random-access non-volatile memory is embedded within the memory controller chip of the managed-NAND system package. The code may be mapped in this memory location and accessed during code read.

Another embodiment of the present disclosure comprises a host processor connected to a managed-NAND system package where the embedded random-access non-volatile memory array is within the managed-NAND system package and coupled to but separate from the memory controller. In one example, the embedded random-access non-volatile memory array may reside as a separate die similar to the SLC or MLC die of the managed NAND. The code may be mapped in this memory location and accessed during code read.

A further embodiment includes a method for accessing the boot code sequence of an electronic device. According to one example, the first lines of the boot code are read by the host processor internal memory and the remaining portion of the boot code is stored and read entirely in the embedded random-access non-volatile memory.

Another embodiment includes a method for accessing the boot code sequence of an electronic device wherein the host processor is further connected to an external volatile memory that may communicate, through a host processor, with the managed-NAND system package that includes a random-access non-volatile memory array. According to one operative mode, part of the boot code is stored in the random-access non-volatile memory array while the remaining of the code is copied from the NAND arrays to the external volatile memory and accessed by the host processor. This method enables a system with two initial access latency times, Another embodiment of the disclosure describes a method for running an application that comprises time-critical and time-non-critical portions. The application may be partitioned to a time-critical portion which is stored in an random-access non-volatile memory array embedded within a managed-NAND system package, and a time-non-critical portion which is stored in NAND flash memory arrays. During access of the application, the host processor issues read commands to the managed-NAND controller. The time-critical portion is read directly from the random-access non-volatile memory array with very fast memory access, while the content of the time-non-critical portion is copied from the NAND flash memory arrays to an external volatile memory and accessed by the host processor.

In the various embodiments of the disclosure, the access to the reliable embedded random-access non-volatile memory array location is done transparently for the user as the same managed-NAND memory pins and protocol may be used to access both the reliable memory area and the mass storage area. The embedded logic blocks of the managed-NAND memory controller remain unchanged and the integration of the random-access non-volatile memory array does not impact the performance of the system host and the NAND dies. In one example, the random-access non-volatile memory array may be excluded from logic actions such as address translation, wear-leveling and bad block management, when faster memory access is required, or perform these logic actions when higher reliability is required by the application to be executed.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification.

FIGS. 3A-3C illustrate a managed-NAND system coupled to a host processor of an electronic device according to various embodiments of the disclosure.

Figure 1:
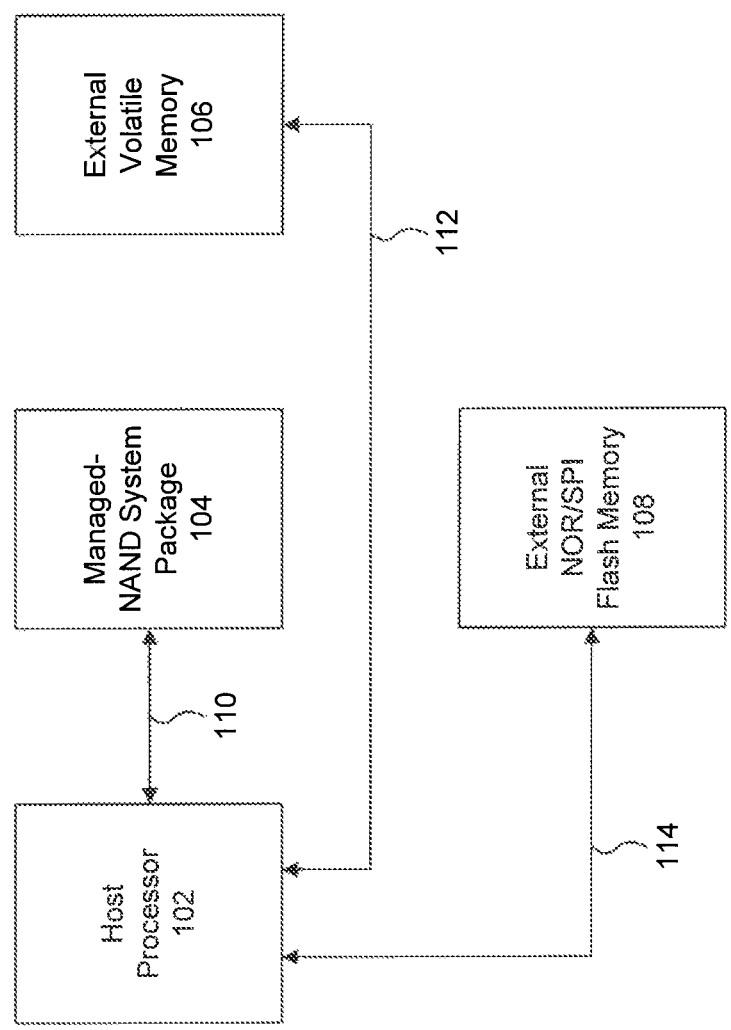
FIG. 1 illustrates a block diagram of a typical electronic device subsystem that includes a host processor coupled to a managed-NAND system package and external volatile and non-volatile memories.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Before describing such embodiments in more detail, however, it is instructive to present an example environment in which embodiments of the present invention may be implemented.

FIG. 1 shows a typical electronic device subsystem 100. The subsystem illustrates a typical host/memory system apparatus, which may consist of a host processor 102, a managed-NAND system package 104, an external volatile memory 106 and an external NOR/(Serial Peripheral Interface) SPI Flash memory 108. Managed-NAND package 104 may be coupled to host processor 102 through port 110, while external volatile memory 106 and external NOR/SPI Flash memory 108 may be coupled to host processor 102 through ports 112 and 114, respectively.

In one example, external volatile memory 106 may be, but is not limited to, a Dynamic Random-Access Memory (DRAM) or a Static Random-Access Memory (SRAM) memory. Host processor 102 may be, but is not limited to, a central processing unit of an electronic device. As it may be apparent to one skilled in the relevant art, there may be other types or more than one volatile or non-volatile memory arrays externally coupled to host processor 102. The blocks depicted herein are shown for exemplary purposes only.

Figure 2:
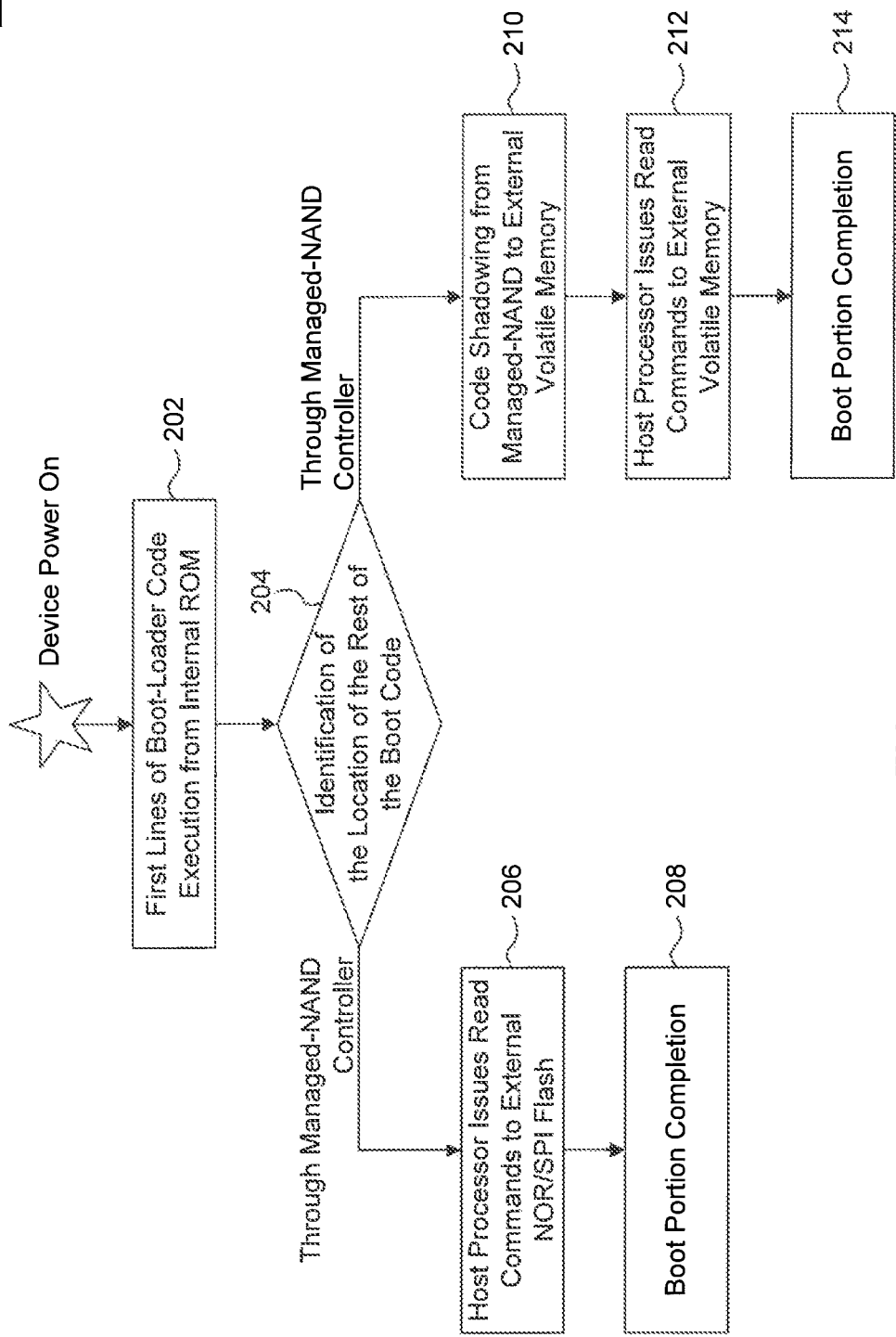
FIG. 2 is a flowchart illustrating a method for executing a boot sequence in a typical electronic device subsystem such as the one shown in FIG. 1.

FIG. 2 is a flowchart depicting a method 200 to execute the boot code sequence in a typical exemplary subsystem such as subsystem 100 of FIG. 1. It is to be appreciated that method 200 may not occur in the order shown, nor include all operations shown. Merely for convenience, elements in FIG. 1 will be used to perform operations shown in method 200.

After the electronic device is powered on, in step 202, the first lines of the boot-loader code may be executed in an internal Read-only Memory (ROM) which resides in host processor 102. Following the initial code execution, in step 204, the system may identify the location of the rest of the boot code. A portion of the boot code may be copied to external NOR/SPI Flash 108 through a managed-NAND controller of the managed-NAND system (step not shown). In step 206, host processor 102 issues read commands to the location of external NOR/SPI Flash 108, completing the boot portion sequence in this location in step 208.

The remaining portion of the boot code may be stored in the NAND Flash arrays of the managed-NAND system package 102. In step 210, the content of the boot code is copied from the managed-NAND system to external volatile memory 106, whereby communication is established through host processor 102 to the managed-NAND memory controller of managed-NAND system package 104 through port 110. Then, data is transferred from host processor 102 to external volatile memory 106 through port 112. This process is also referred to as code shadowing or shadow mode. Following code shadowing, in step 212, host processor 102 issues read commands to external volatile memory 108 for the remaining portion of the boot code and completes the boot portion sequence in this location in step 214.

In method 200, an external NOR/SPI Flash memory or other non-volatile memory with fast read-random access characteristics is used to execute the time-critical portion of the boot sequence and compensate for the slow access of the NAND arrays of the managed-NAND. As it may be appreciated by one skilled in the art, this external NOR/SPI Flash memory may occupy significant space in the overall system and may require additional interconnections to be coupled to the host system. This occupied real estate cannot be used by a system designer or a user in other applications.

Figure 3A:
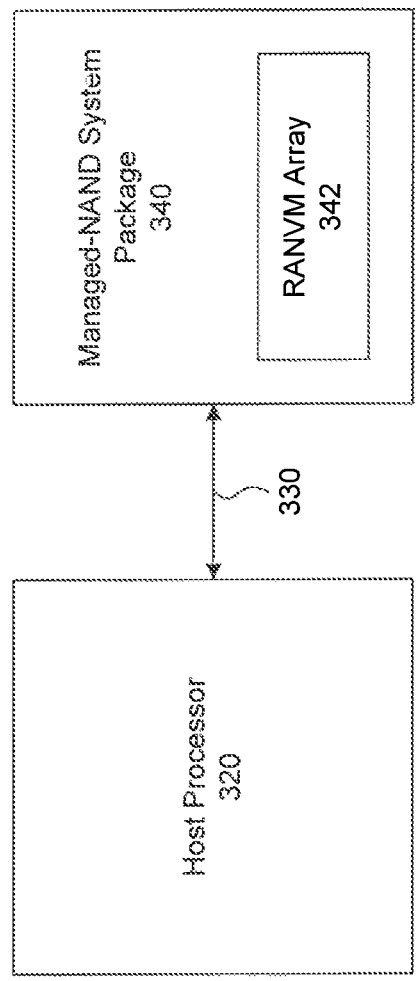

FIG. 3A illustrates an exemplary block diagram of an electronic device sub-system according to one embodiment of the present disclosure. A host processor 302 may be coupled through a bus interface 330 to a managed-NAND system package 340, wherein a random-access non-volatile memory (RANVM) array 342 may be embedded.

In one example, random-access non-volatile memory array 342 is based on any technology that permits fast and reliable read random-access of time-critical applications, such as the boot code. For example, RANVM 342 may be but is not limited to, a memristive memory array, a phase-change memory array, a NOR Flash array based on floating gate technology, a NOR Flash array based on a charge storage dielectric stack layer (e.g. an embedded charge trap), a NAND Flash array based on floating gate technology, or a NAND Flash array based on a charge storage dielectric stack layer (e.g. an embedded charge trap). Embedded RANVM array 342 can be of any size to facilitate storage of data required by any application of host processor.

FIG. 3B shows a more detailed block diagram schematic of sub-system 300 according to one embodiment of the present disclosure. Host processor 320 may be coupled to manage-NAND system package 340 through interface bus 330. The managed NAND system package 340 may further comprise a managed-NAND memory controller 344 coupled to single level chip (SLC) or multi-level chip (MLC) NAND dies 346, which are NAND Flash memory arrays, through internal NAND bus 348. According to one example, embedded RANVM array 342 may reside as a chip within the chip of managed-NAND controller 344.

FIG. 3C shows a more detailed block diagram schematic of sub-system 300 according to one embodiment of the present disclosure. Host processor 302 may be coupled to manage-NAND system package 340 through interface bus 330. Managed-NAND system package 340 may further comprise a managed-NAND memory controller 344 coupled to single level chip (SLC) or multi-level chip (MLC) NAND dies 346, which are NAND Flash memory arrays, through internal NAND bus 348. Managed-NAND system package 340 may further comprise an embedded RANVM array 342 through internal bus 349. In one example, embedded RANVM array 342 may reside in managed-NAND system package 340 but as a separate chip from managed-NAND controller 344.

According to alternative embodiments of the disclosure shown in FIGS. 3A, 3B, and 3C, the embedded RANVM array is coupled to the host processor through the same managed-NAND bus, making the connection transparent to the user.

Figure 4:
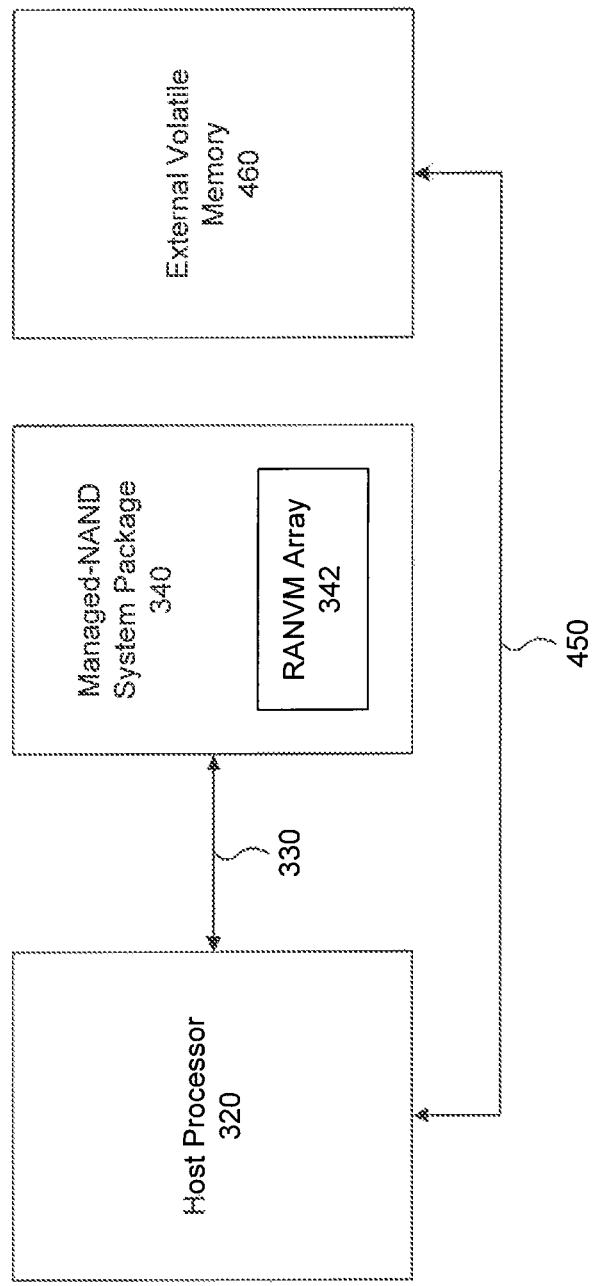
FIG. 4 illustrates a host processor coupled to a managed-NAND system and an external volatile memory according to one embodiment of the disclosure.

FIG. 4 shows a block diagram of a subsystem 400 according to another exemplary embodiment of the present disclosure. This subsystem comprises host processor 320, managed-NAND system package 340 with embedded RANVM array 342, and an external volatile memory 460. As previously, host processor 320 is coupled to managed-NAND system package 402 through internal bus 330, and to external volatile memory 460 through bus 450.

In accordance with various exemplary embodiments of the disclosure, such as those shown in FIGS. 3A-3C, it may be appreciated that embedded RANVM array 342 may be integrated in a memory controller chip of managed-NAND system package 340, or it may be integrated as a separate chip on the board of managed-NAND system package 340.

Figure 5:
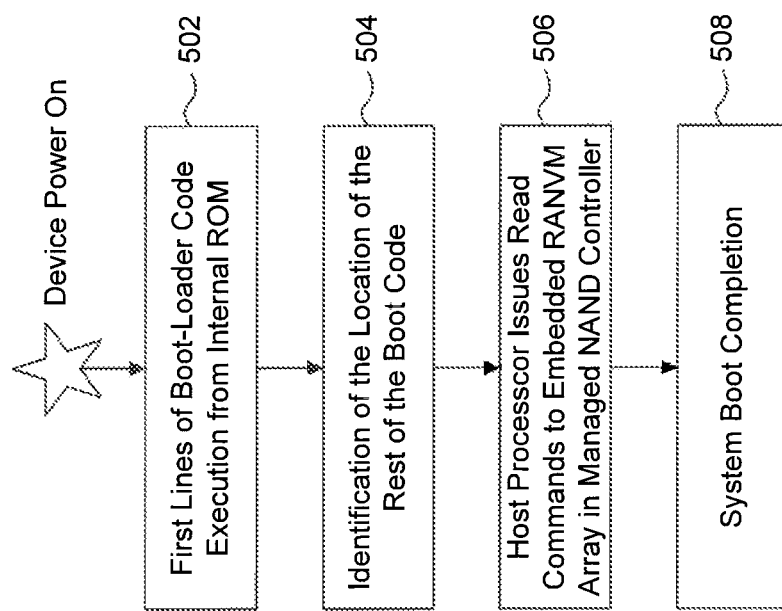
FIG. 5 is a flowchart depicting a method for executing a boot sequence in an electronic device according to one embodiment of the disclosure.

FIG. 5 is a flow-chart depicting a method 500 for executing the boot sequence in an electronic device according to one embodiment of the present disclosure. It is to be appreciated that method 500 may not occur in the order shown, nor include all operations shown. Merely for convenience, elements in FIG. 3 will be used to perform operations shown in method 500.

After device power on, in step 502 the first lines of the boot-loader code are read and executed in an internal non-volatile read-only memory of host processor 320. Following the initial code execution, in step 504, host processor 504 may identify the location of the rest of the boot code. According to one example, the remaining portion of the boot code may reside entirely in embedded RANVM array 342 of managed-NAND system package 340. In step 506, the host processor may issue read commands to a memory controller of managed-NAND system package 340. The memory controller may access the embedded RANVM array and read the remaining portion of the code to complete the sequence in step 508.

Method 500 may be applicable, but not limited, to boot code or other similar applications where the size of the code is small enough to be completely stored in the embedded random-access non-volatile memory array. Due to the very fast access time involved in reading data from this memory, the system latency may be significantly reduced. For example, in the case where the random-access non-volatile memory is a NOR Flash array, the initial latency time may be less than, e.g., 20 ns. In comparison, the latency times when copying code from NAND Flash arrays may be between approximately 25 μs and approximately 75 μs for SLC or MLC die, according to one example. Therefore, integration of a fast read random-access non-volatile memory in a managed-NAND system may greatly improve the system latency time when running the boot code.

Figure 6:
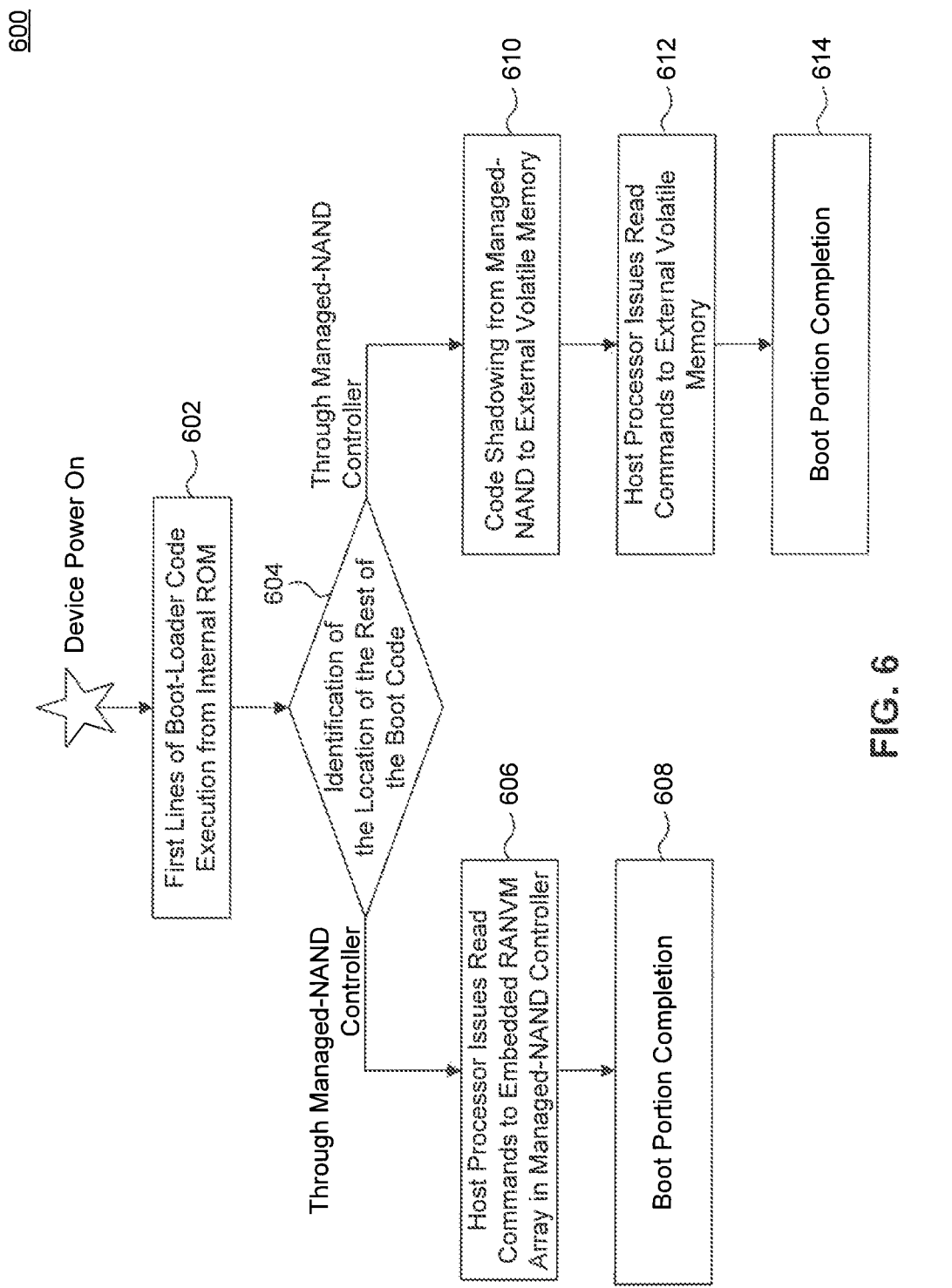
FIG. 6 is a flowchart depicting a method for executing a boot sequence in an electronic device according to another embodiment of the disclosure.

FIG. 6 shows method 600 for executing the boot code sequence in an electronic device according to another aspect of the present disclosure. It is to be appreciated that method 600 may not occur in the order shown, nor include all operations shown. Merely for convenience, elements in FIG. 4 will be used to perform operations shown in method 600.

After device power on, in step 602 the first lines of the boot-loader code are read and executed in an internal non-volatile read-only memory of host processor 320. Following the initial code execution, in step 604, the host processor may identify the location of the rest of the boot code.

According to one example, the remaining portion of the boot code may be partitioned in two sub-portions. A first sub-portion residing in embedded random-access non-volatile memory array 340. And a second sub-portion stored in the non-volatile memory arrays of the managed-NAND system (either the embedded random-access non-volatile memory or the NAND Flash memory arrays of the managed-NAND, or a combination thereof). In step 606, host processor 320 issues read commands to embedded RANVM array 342 controller through managed-NAND controller 344. In step 608, the RANVM array and may execute this first portion of the hoot code to complete the hoot sequence in this location.

For the second sub-portion, in step 610 the data content may be shadowed from the non-volatile memory arrays of managed-NAND system package 340 through host processor 320 to external volatile memory 460. In step 612, host processor 320 may issue read commands to external volatile memory 460. In step 614, host processor 320 may execute the second portion of the remaining of the boot code in this location to complete the boot portion sequence.

It should be appreciated that according to method 600, there may be more than two portions of the remaining of the hoot code. Thus, in addition to execution in place (XiP) and shadow modes, the system may have a third mode of execution (paging or intermediate mode) where the host processor may grab pieces of the code as needed from the non-volatile memory arrays of the managed-NAND.

In one example, method 600 may be particularly applicable, but not limited, to boot code or other application sequence where the size of the application is too large to be fully stored in the embedded random-access non-volatile memory array. In some system architectures for example, it may not be cost-efficient to store a very large application in this memory, as it may increase the device area required beyond the system limitations. In such a case, the system may use the embedded RANVM array to run a first portion of the boot code with a first initial access latency (which may be less than about 20 ns), and the remaining portion of the boot code in shadow or paging mode through an external volatile memory with a second latency (which be on the order of tens of μs).

Figure 7:
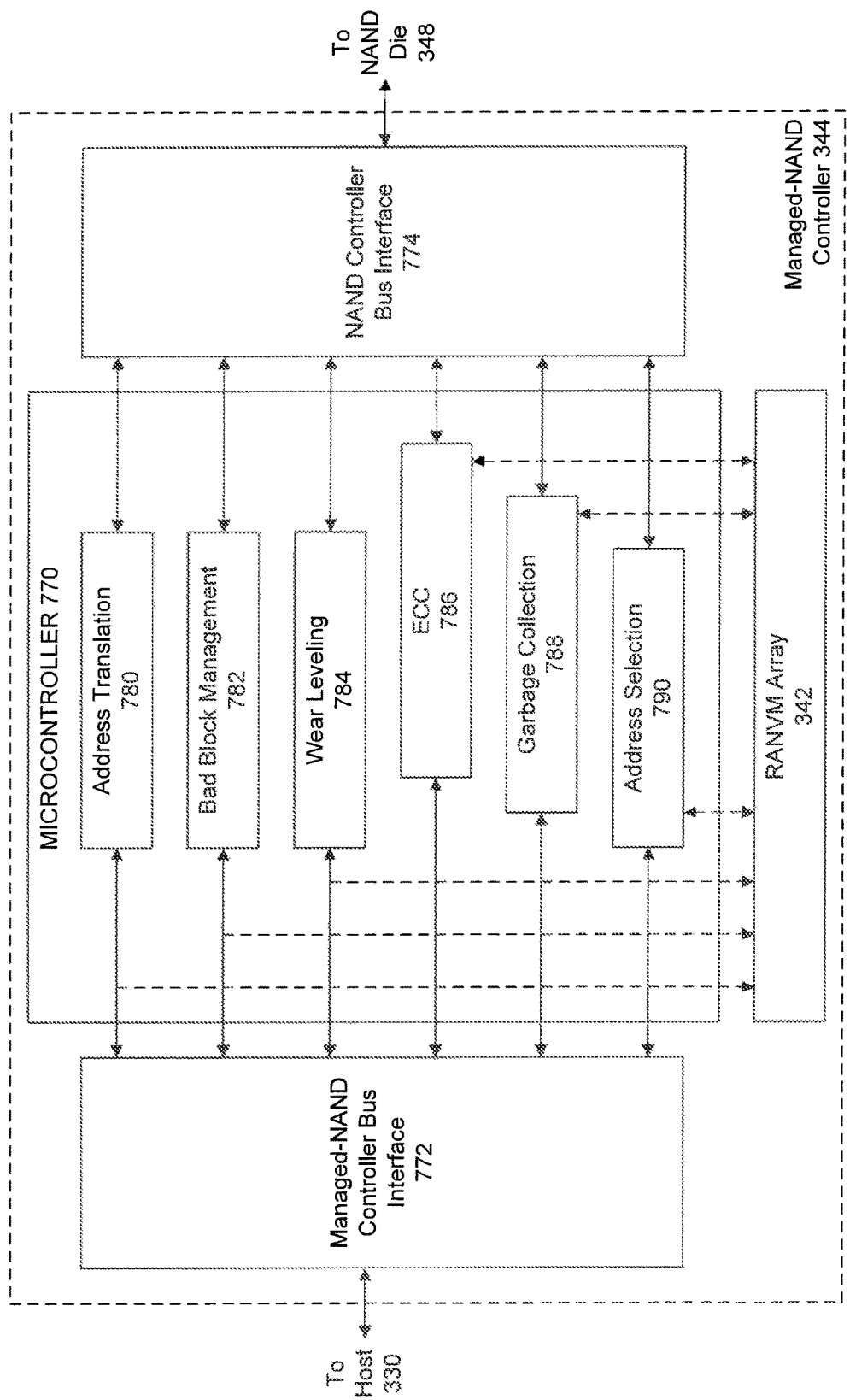
FIG. 7 is a block diagram of a managed-NAND controller showing various physical and logic blocks according to one embodiment of the disclosure.

FIG. 7 shows an internal block diagram schematic of managed-NAND controller 344. In this schematic, physical and logic blocks, as well as interconnections thereof, are shown, according to one embodiment of the present disclosure. Managed-NAND controller 344 comprises a microcontroller 770 which may be configured to execute several logic functions shown by blocks 780 through 790. It should be appreciated that the hardware block components that may be associated with these logic functions are not shown in this example. The terms "logic function" and logic block may be used interchangeably hereafter to refer to blocks 780 through 790 of FIG. 7.

Microcontroller 770 may be coupled to a host processor through a managed-NAND controller bus interface 772, and to the MLC or SLC NAND Flash die through a NAND controller bus interface 774. Microcontroller 772 may also be coupled to RANVM array 342 embedded within managed-NAND controller 344 (connection not shown). In this example, RANVM array 342 is shown to reside within the managed-NAND controller chip. But, as it may be apparent to one skilled in the art from the embodiments of FIGS. 3A-3C and FIG. 4, this memory array may also be a separate chip within the managed-NAND system package.

As indicated in FIG. 7, microcontroller 770 may perform several logic functions to interface with the host system and the non-volatile memory arrays. The logic blocks for address translation 780 and address selection 790 may correspond to the decoding and translation of the commands issued by the host and the selection of the proper address location in the memory that is requested by a specific operation.

The remaining logic blocks (784-790) are aimed at addressing the reliability issues encountered in NAND Flash memories. In particular, error code correction (ECC) block 786 may comprise algorithms that check and correct the specific bits that are read from the memory arrays. When ECC 782 cannot correct the errors within a memory block, the bad block management logic function 782 may remove this block from the address map of the memory, and it then may be collected with a garbage collection function 712. Wear leveling logic function 784 may provide a mechanism to avoid over-usage of a memory array by enabling remapping of the memory contents at different locations of the memory array so that every memory cell may be used at the same extent on average.

It may be appreciated that these logic functions may add extra latency time to that involved in reading data content from the non-volatile memory arrays. According to the embodiment of FIG. 7, as indicated by the dotted arrows, the embedded random-access non-volatile memory may or may not be associated with these logic functions, depending on the requirements of a particular application. For example, when initial fast access is preferred, the embedded random-access non-volatile memory may be excluded from performing address translation, bad block management and wear leveling. In another example, when increased levels of reliability are required, the embedded random-access non-volatile memory may perform all or part of these logic functions. By configuring the embedded random-access non-volatile memory in such a manner, the system designer may utilize the advantages this array provides to optimize system performance depending on the desired application.

The various system embodiments and methods described herein may not be limited to boot code execution. They can be applied to any application that involves latency-critical or sensitive portions. Such an application may be partitioned to a time-critical (latency-critical) portion and time-non-critical (latency-non-critical) portion. Execution of each portion may be performed at different memory locations of a managed-NAND system. For example, in a car navigation application it may be critical to quickly load the graphical user interface to make it available to the user. This action may comprise a first time-critical portion of the application. Then, the several actions that a user may select from the graphical interface, or the calculations that may take place in the background, may be partitioned to one or more time-non-critical portions.

Figure 8:
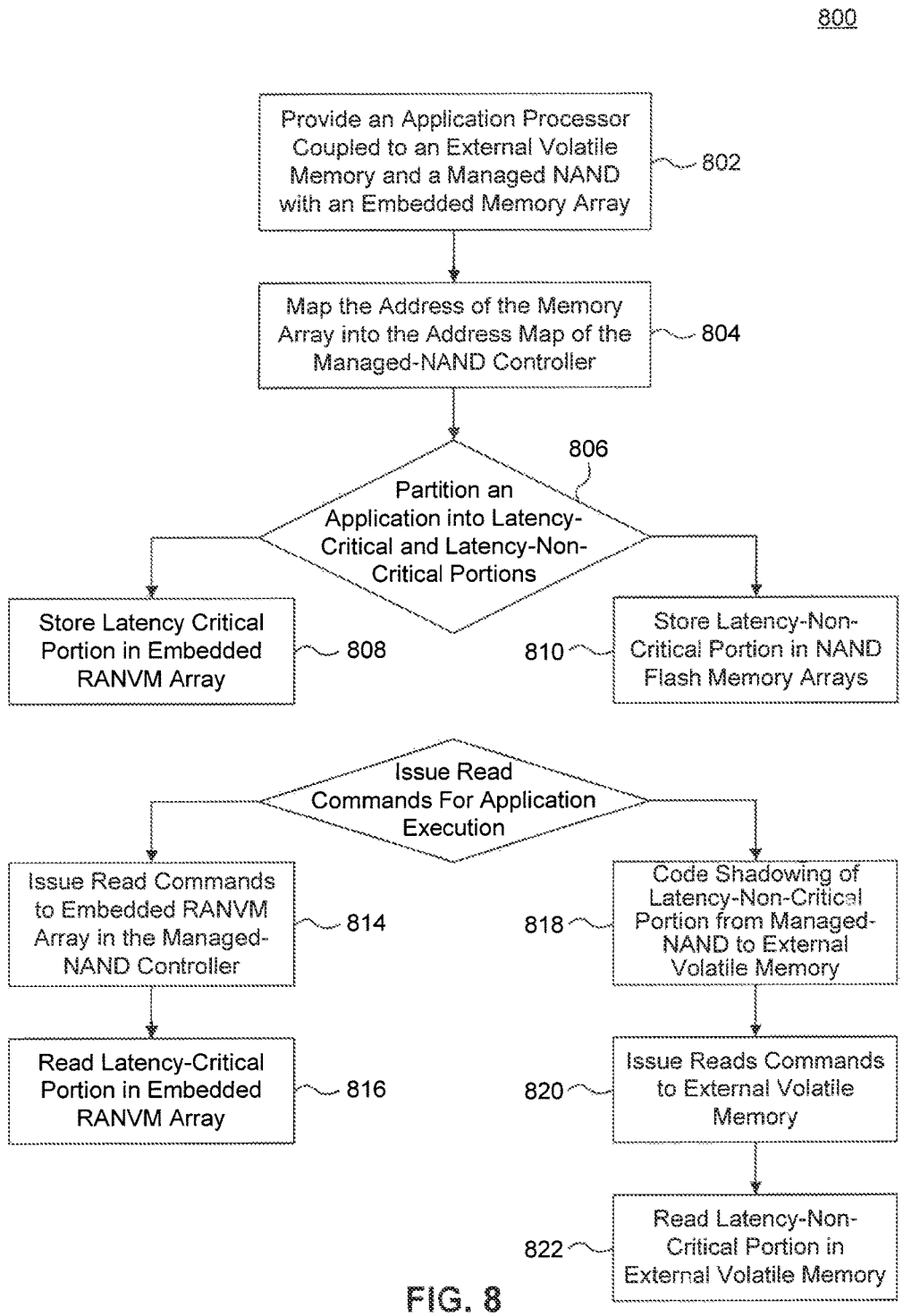
FIG. 8 is a flowchart depicting method for executing an application that comprises a time-critical and time-non-critical portion in a subsystem of an electronic device according to an embodiment of the disclosure.

FIG. 8 is a flow-chart depicting a method 800 to execute any application such as that of the aforementioned example, wherein an application may be partitioned to a latency-critical and a latency-non-critical portion, according to an exemplary embodiment of the present invention. It is to be appreciated that method 800 may not occur in the order shown, nor include all operations shown. Merely for convenience, elements in FIG. 4 will be used to perform operations shown in method 800.

In step 802, a system comprising an application processor coupled to an external volatile memory and a managed-NAND system with an embedded RANVM array is provided. In step 804, the address of the embedded random-access non-volatile memory array is mapped into the address map of a managed-NAND controller of the managed-NAND system.

In step 806, the application to be executed by the application processor is partitioned into a latency-critical and a latency-non-critical portion. In step 808, the latency critical portion may be stored in the embedded RANVM array. In step 810, the latency-non-critical portion may be stored in the NAND Flash memory arrays of the managed-NAND system. However, combinations of various non-volatile memory locations may also be possible.

In step 812, the application processor may issue read commands for execution of the application. In step 814, the application processor may issue read commands to the embedded RANVM array through the managed-NAND controller of the managed-NAND system. In step 816, the latency-critical portion of the application may be read in the embedded RANVM array.

In step 818, the contents of the latency-non-critical portion may be shadowed to the external volatile memory through the managed-NAND controller and the application processor. In step 820, the application processor may issue read commands to the external volatile memory. And, in step 822, the latency-non-critical portion may be read in the external volatile memory.

In method 800, the embedded random-access non-volatile memory may be, but not limited to, any array based on NOR Flash technology (floating gate or embedded charge trap), or memristive or phase-change memory technology.

When operating according to method 800, the application processor may permit legacy mode operation of the managed-NAND system. In this mode, a sequence of register read/write transactions may be used to program the desired transactions into control registers of the managed-NAND controller and provide an indication that the managed-NAND controller may execute the programmed sequence. In other instances according to one example, when the address range of the embedded random-access non-volatile memory is mapped into a memory space of the central processing unit of the application processor, in addition to the memory space of the managed-NAND controller, the application processor may acquire direct and low latency access to addresses in the embedded random-access non-volatile memory. In this case, the system may operate in XiP mode of operation. It may also be appreciated by one skilled in the pertinent art that the application may be partitioned to more than two portions that may be shadowed to more than one external volatile memories. Alternatively, the application processor may access these partitioned portions when needed, thus operating in paging mode.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the, hardware, methods and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method comprising:
mapping a random-access non-volatile memory address into an address map of a memory controller;
partitioning an application into a latency-critical portion and a latency-non-critical portion;
storing the latency-critical portion in a random-access non-volatile memory array embedded within the memory controller and the latency-non-critical portion in a NAND memory array;
issuing a read command from an application processor to the memory controller;
copying data content of the latency-non-critical portion from the NAND memory array to an external volatile memory;
reading the latency-critical portion of the application in the embedded random-access nonvolatile memory; and
reading the latency-non-critical portion of the application in the external volatile memory.

2. The method of claim 1, further comprising permitting legacy mode operation.

3. The method of claim 1, further comprising mapping an address range of the embedded random-access non-volatile memory array into a memory space of a central processing unit of the application processor, the application processor having direct low-latency access to addresses in the embedded random-access non-volatile memory.

* * * * *